United States Patent [19]
Parker

[11] Patent Number: 6,131,164
[45] Date of Patent: Oct. 10, 2000

[54] REVERSE INTERNET PROTOCOL LOOKUP

[75] Inventor: Terrence Lee Parker, Overland Park, Kans.

[73] Assignee: Sprint Communications Company, L.P., Kansas City, Mo.

[21] Appl. No.: 09/032,330

[22] Filed: Feb. 27, 1998

[51] Int. Cl.[7] .................................................. G06F 13/00
[52] U.S. Cl. .................. 713/201; 713/200; 709/225; 709/226; 709/227
[58] Field of Search ................... 713/201, 202, 713/200; 709/224, 227, 229, 225, 226

[56] References Cited

U.S. PATENT DOCUMENTS

| | | | |
|---|---|---|---|
| 5,684,950 | 11/1997 | Dare et al. | 713/201 |
| 5,812,819 | 9/1998 | Rodwin et al. | 395/500 |
| 5,987,232 | 11/1999 | Tabuki | 713/201 |
| 6,009,103 | 12/1999 | Woundy | 370/401 |
| 6,013,107 | 1/2000 | Blackshear et al. | 703/229 |
| 6,052,725 | 4/2000 | McCann et al. | 709/223 |
| 6,055,574 | 4/2000 | Smorodinsky et al. | 709/226 |
| 6,055,637 | 4/2000 | Hudson et al. | 713/201 |
| 6,073,178 | 6/2000 | Wong et al. | 709/229 |

*Primary Examiner*—Robert W. Beausoliel, Jr.
*Assistant Examiner*—James G. Weir
*Attorney, Agent, or Firm*—Harley R. Ball; Steven J. Funk

[57] ABSTRACT

A method of accessing an external system from a network without entering a password to enter the external system. The method includes the steps of a user gains access to a network and creating a unique dynamic address associated with the user for the period of time upon which the user first gains access to the network to the time the user signs off of the network. Relaying the unique dynamic address to an external system and the user gains access to the external system based on the unique dynamic address and without entering a password associated with the external system.

32 Claims, 1 Drawing Sheet

REVERSE INTERNET PROTOCOL LOOKUP

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to a system and method for identifying a user on the Internet without entering a password or the like.

2. Discussion of Related Art

It is known in the art that when a user tries to access a web site or other systems, the only identification provided by the user is the user's Internet Protocol (IP) address. Typically, a web site or other system cannot identify who the user actually is based upon the Internet Protocol address alone. In order to identify the user, the web site or system uses a separate identification method to identify the user. A common method is to have the user enter a unique password or identification number that is assigned to the user by the web site. If the password or identification number is correctly entered, then the individual user has been identified.

One disadvantage of such a system is that the user needs to memorize and enter separate passwords and identification numbers in order to gain access to one or more web sites or systems. One attempt to overcome this problem is to use known password management systems that store the multiple passwords on a personal computer. Such password management systems hinder the user from using multiple personal computers, since the passwords needed may be stored on a machine that is not currently being used.

Another disadvantage of such a system is that the user or customer is often required to enter user related information at each web site or system that he or she attempts to access.

SUMMARY OF THE INVENTION

One aspect of the present invention regards a telecommunications system that includes a network with an authentication system that is connected to the network and a dynamic address generator that generates a unique dynamic address associated with the user of the network for the period of time upon which the user first gains access to the network to the time the user signs off of the network. An external system is connected to the network so that the unique dynamic address associated with the user is relayed to the external system when the user attempts to gain access to the external system from the network, the unique dynamic address allows the user to gain access to the external system without entering a password associated with the external system.

A second aspect of the present invention regards a method of accessing an external system from a network without entering a password to enter the external system. The method includes the steps of a user gaining access to a network and creating a unique dynamic address associated with the user for the period of time upon which the user first gains access to the network to the time the user signs off of the network. The user attempts to gain access to an external system connected to the network. Relaying the unique dynamic address to the external system and the user gains access to the external system based on the unique dynamic address and without entering a password associated with the external system.

A third aspect of the present invention regards a telecommunications system that includes a network, an authentication system connected to the network that has a dynamic address generator that generates a unique dynamic address associated with the user for the period of time upon which the user first gains access to the network to the time the user signs off of the network. An external system is connected to the network so that the unique dynamic address associated with the user is relayed to the external system when the user attempts to gain access to the external system from the network. A data storage and transfer system connected to said external system and includes a memory with a database of sessions data regarding users of the external system. The external system queries the data storage and transfer system and requests a session record lookup based upon the dynamic address.

Another aspect of the present invention regards a method of accessing an external system from a network by having a user gain access to a network and creating a unique dynamic address associated with the user for the period of time upon which the user first gains access to the network to the time the user signs off of the network. The user attempts to gain access to the external system connected to the network. The unique dynamic address is relayed to the external system and the user gains access to the external system based on the unique dynamic address. A data storage and transfer system is queried and a session record lookup is requested based upon the dynamic address.

Each of the first two aspects of the present invention provides the advantage that the user only needs to memorize a single password or identification number in order to gain access to a plurality of web sites or systems.

Each of the first two aspects of the present invention provides the advantage that the user can gain access to a plurality of web sites or systems by using a single password or identification number independent of whatever personal computer or browsing device that the user happens to be using.

Each of the first two aspects of the present invention provides the additional advantage that user or customer related information is retrieved by a web site or system without the need for the user or customer to enter the information at the time of entering the web site or system.

The last two aspects of the present invention provide the advantage that information regarding a user or customer can be readily accessed and used to customize the services offered to the user or customer.

The foregoing features and advantages of the present invention will be further understood upon consideration of the following detailed description of the invention taken in conjunction with the accompanying drawings, in which:

DETAILED DESCRIPTION OF THE PREFERRED EMBODIMENT

Figure 1:
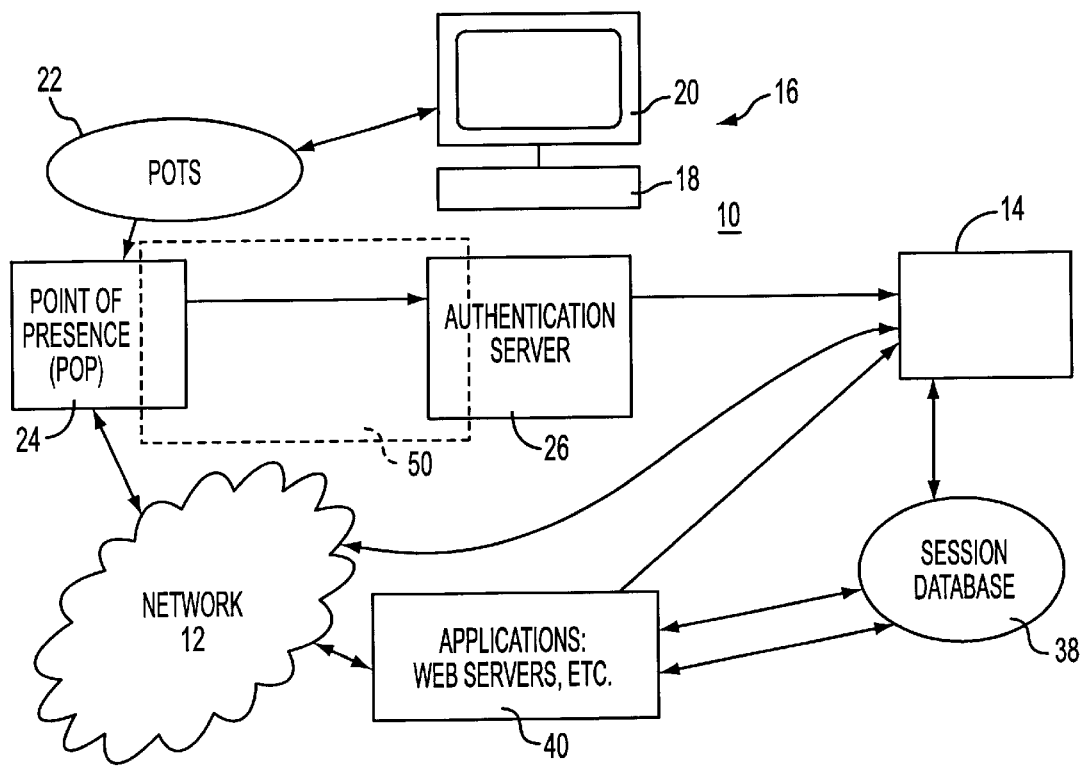
FIG. 1 schematically shows an embodiment of a telecommunications system according to the present invention.
Figure 2:
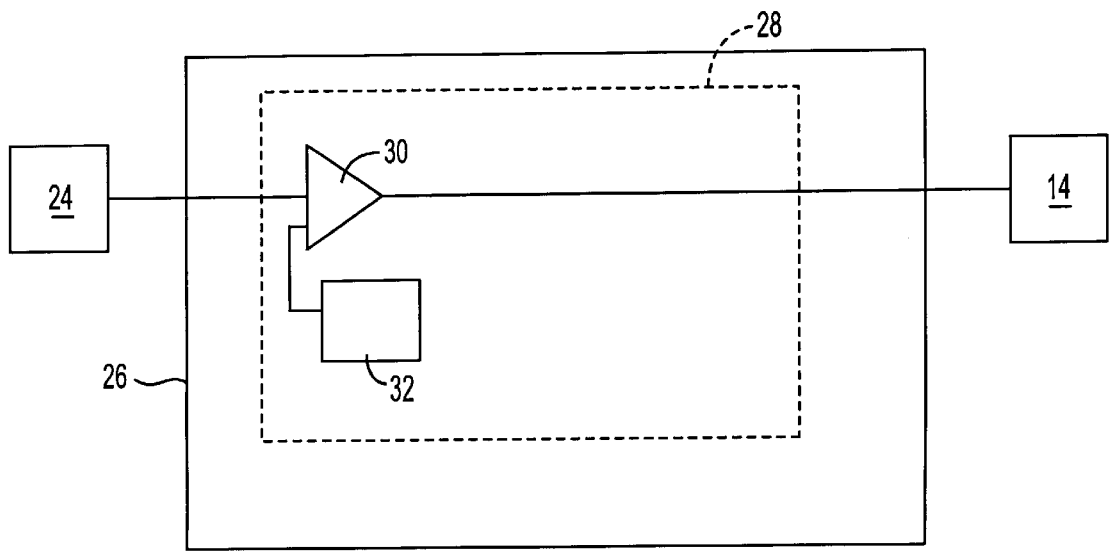
FIG. 2 schematically shows an embodiment of an authentication system to be used with the telecommunications system of FIG. 1.

Referring now to the drawings wherein like reference characters designate identical or corresponding parts throughout the several figures, and in particular FIGS. 1–2 show a telecommunications system 10 that includes a network 12 electronically connected to a data storage and transfer system 14, such as a web site, e-mail or a customer management and billing system. A user gains entry to the network 12 by entering a password or an identification number into a data entry device 16 that is electronically connected to the network 12. An example of a data entry device 16 is a keyboard 18 and a personal computer 20. The user gains access to the network 12 by dialing the network 12 up on the data entry device 16, via plain old telephone service (POTS) lines 22, a point of presence (POP) 24 using a Point-to-Point Protocol (PPP) dial up client software, such as "Dial-Up Networking" software available from Microsoft Windows 95. The software establishes a modem connection with the point of presence 24 and requests authentication of the user to use the network 12 via a certain protocol, such as a standard Challenge-Handshake Authentication Protocol (CHAP), a Password Authentication Protocol (PAP) or a "scripted terminal" protocol, to a dial-up point of presence (POP) 24. As shown in FIG. 1, the point of presence 24 sends the authentication request to an authentication server 26 using a protocol that is a modified as such publicly available servers as the Tacacs+ server or the Cisco Tacacs+ server that use the standard Tacacs protocol. The authentication server 26 is modified at the interface with the data storage and transfer system 14 so that the authentication server 26 is able to work with the data storage and transfer system 14. In addition, the authentication server 26 and the point of presence 24 are configured so as to function as a dynamic address generator that generates a unique dynamic Internet Protocol address, assign the generated dynamic Internet Protocol address to the user and then send the dynamic Internet Protocol address assigned to the user to the data storage and transfer system 14 as explained below.

As schematically shown in FIG. 2, the authentication server 26 includes an authentication system 28 that receives the authentication request and sends the request to a comparator 30. The comparator 30 compares the identity of the user with two or more databases of users (such as corporate users and individual users) stored in the memory 32. If the user is, for example, a corporate user, then the authentication request goes directly to the data storage and transfer system 14 without a dynamic address attached thereto and the validity of the entered password is compared with a database of passwords for gaining access to the network 12 that have been previously stored in the data storage and transfer system 14. Access to the network 12 is allowed to the corporate user if the entered password is valid. Access to the network 12 is refused to the corporate user if the password is invalid.

If the user is, for example, an individual, then the authentication server 26 will contact the data storage and transfer system 14 to see if the entered password is valid. If it is not, access to the network 12 is denied. If the password is valid, then the data storage and transfer system 14 contacts the point of presence 24 via authentication server 26. Next, one of the available Internet Protocol addresses stored at the point of presence 24 is selected and assigned to the user. At this stage, the authentication server 26 sends both the user's entered password and his or her assigned dynamic address to the data storage and transfer system 14.

Once the data storage and transfer system 14 receives the entered password and the assigned dynamic address, the data storage and transfer system 14 stores the assigned dynamic address within the session data base memory 38. In addition, the data storage and transfer system 14 creates and stores a session record for the user by storing the user's dynamic address with the session record look-up associated with the user that is stored in the session database memory 38. Note that the session database memory 38 may be part of the data storage and transfer system 14.

The use of a session record allows one or more external systems or programs 40, such as a web server, an e-commerce transaction system, a customized start page or an e-mail subsystem, to determine the identity of a user that is attempting access to the external system 40. When the user attempts to access the external system 40, the user's dynamic address is relayed to the external system 40 which in turn queries the data storage and transfer system 14 and requests a session record lookup from the session database memory 38 based upon the received dynamic address. In response to the request, the data storage and transfer system 14 directs the sessions database memory 38 to relay to the external system or program 40 the user's session information and the user's account identifier stored with the data storage and transfer system 14. Based on the return sessions information and the account identifier associated with the user, the external system or program 40 can now determine whether the user is allowed access to the external system 40. Thus, the unique dynamic address allows the user to gain access to the external system 40 without entering a password associated with the external system 40. Once the user is allowed access to the external system 40, the external system 40 can make further queries with the data storage and transfer system 14 to retrieve more information, such as customer records and accounts, that are stored in the sessions database memory 38 and are associated with the user with the unique dynamic address. This allows the operators of the external system 40 not only to determine whether or not the user associated with the dynamic address is a customer of the external system's service or some other entity, but also to retrieve the user's customer information from the session database memory 38 and use that information to possibly present the external system 40 differently to the user or allow/disallow certain features or functionality in the external system 40 based on the user's profile.

Once the user signs off of the network 12, the dynamic address is taken out of the session database memory 38, returned to the authentication server 26 and returned to the point of presence 24 where it is stored to be used by another user. Thus, the dynamic address is unique in that it exists only for a single session, the period of time upon which the user first gains access to the network 12 to the time the user signs off of the network 12.

The foregoing description is provided to illustrate the invention, and is not to be construed as a limitation. Numerous additions, substitutions and other changes can be made to the invention without departing from its scope as set forth in the appended claims. For example, the present invention can be used for a variety of different uses, including: electronic commerce transactions, subscription based services and personalization of services or web site price plan flexibility.

I claim:

1. A telecommunications system, comprising:
    a network;
    a dynamic address generator that creates a unique dynamic address associated with a user for the period of time upon which the user first gains access to said network to the time the user signs off of said network;
    a data storage and transfer system comprising a memory that includes a database of sessions data regarding users of said network; and an external system connected to said network and said data storage and transfer system so that said unique dynamic address associated with said user is relayed to said external system when said user attempts to gain access to said external system; and said external system queries said data storage and transfer system and requests a session record lookup based upon said dynamic address.

2. The telecommunications system of claim 1, wherein said memory returns to said external system system the requested session information and the user's account identifier.

3. The telecommunications system of claim 2, wherein said external system makes further queries with said data storage and transfer system based on said returned session information and the account identifier in order to retrieve more information regarding said user.

4. The telecommunications system of claim 1, wherein said unique dynamic address allows said user to gain access to said external system without entering a password associated with said external system.

5. A method of accessing an external system from a network, said method comprising the steps of:

a user gains access to a network;

creating a unique dynamic address associated with said user for the period of time upon which the user first gains access to said network to the time the user signs off of said network;

relaying said unique dynamic address to an external system; and said user gains access to said external system based on said unique dynamic address; and querying a data storage and transfer system and requesting a session record lookup based upon said dynamic address.

6. The method of claim 5, further comprising the step of: supplying the requested session information and the user's account identifier to the external system.

7. The method of claim 6, comprising the step of:

making further queries with said data storage and transfer system based on said returned session information and the account identifier in order to retrieve further information regarding said user.

8. The method of claim 7, wherein said further information regarding said user comprises customer records and accounts.

9. The method of claim 7, wherein said external system is presented differently to said user based on said further information so as to allow/disallow certain features or functionality in said external system.

10. The method of claim 8, wherein said external system is presented differently to said user based on said further information so as to allow/disallow certain features or functionality in said external system.

11. The method of claim 5, wherein said unique dynamic address allows said user to gain access to said external system without entering a password associated with said external system.

12. A system for enabling a user to access an external system connected to a network, comprising in combination:

a dynamic address generator operative to assign a unique address to a user requesting access to the network, wherein the unique address is relayed to the external system when the user attempts to access the external system; and a data storage and transfer system operative to store a session record including the unique address and user identity information, wherein the data storage and transfer system is operative to relay the user identity information to the external system in response to a query from the external system, and wherein the query identifies the unique address, thereby enabling the external system to determine whether the user is authorized to access the external system.

13. The system of claim 12, wherein the unique address is an Internet Protocol (IP) network address.

14. The system of claim 12, wherein the dynamic address generator comprises a point-of-presence and an authentication server, wherein the point-of-presence enables the user to access the network through a POTS line, wherein the authentication server receives an authentication request from the user, and wherein the authentication server accesses a database to determine whether to forward the authentication request to the data storage and transfer system.

15. The system of claim 12, wherein the dynamic address generator comprises a point-of-presence and an authentication server, wherein the point-of-presence enables the user to access the network through a POTS line, and wherein the authentication server receives an authentication request from the user.

16. The system of claim 15, further comprising a data entry device linked to the point-of-presence, wherein the data entry device enables the user to make the authentication request, and wherein the authentication request includes a password.

17. The system of claim 16, wherein the user identity information includes the password.

18. The system of claim 15, wherein the authentication server includes a comparator and a memory, wherein the memory stores two or more databases of users of the network, and wherein the comparator identifies the user with one of the users stored in the two or more databases.

19. The system of claim 12, wherein the external system is selected from the group consisting of a web site, a web server, an e-commerce transaction system, a customized start page, and an e-mail subsystem.

20. The system of claim 12, wherein the data storage and transfer system is operative to relay the session record to the external system in response to receiving the query from the external system.

21. A method for enabling a user to access a first system connected to a network, comprising in combination:

receiving an authentication request from the user;

authenticating the user to enable the user to access the network;

assigning a unique address to the user, wherein the unique address is relayed to the first system when the user attempts to access the first system;

storing a session record at a second system, wherein the session record includes the unique address and user identity information;

receiving at the second system a query from the first system, wherein the query includes the unique address; and relaying the user identity information from the second system to the first system in response to the query.

22. The method of claim 21, wherein the unique address is an Internet Protocol (IP) network address.

23. The method of claim 21, wherein the authentication request is entered by the user at a data entry device, and wherein the authentication request is received across a POTS line connected to the data entry device.

24. The method of claim 21, further comprising accessing a database to determine whether to forward the authentication request to the second system.

25. The method of claim 24, further comprising identifying the user in the accessed database.

26. The method of claim 21, wherein the authentication request includes a password.

27. The method of claim 26, wherein the user identity information includes the password.

28. The method of claim 26, wherein the step of authenticating the user includes determining whether the password is a valid password for the user.

29. The method of claim 21, wherein the first system is selected from the group consisting of a web site, a web server, an e-commerce transaction system, a customized start page, and an e-mail subsystem.

30. The method of claim 21, further comprising relaying the unique address to the first system in response to receiving the query.

31. The method of claim 21, wherein the user identity information includes information regarding the user.

32. The method of claim 31, wherein the first system is one of a plurality of external systems accessible through the network, and wherein each of the plurality of external systems is operable to send a query to the second system in response to an access attempt by the user.

* * * * *